US012644315B2

(12) United States Patent
Minter et al.

(10) Patent No.: US 12,644,315 B2
(45) Date of Patent: Jun. 2, 2026

(54) WINDOW OPENING CONTROL DEVICE

(71) Applicant: Interlock USA, Inc., Reno, NV (US)

(72) Inventors: Peter J. Minter, Reno, NV (US); Marc Wesley Fullenwider, Reno, NV (US); Jacob Baitx, Reno, NV (US)

(73) Assignee: ASSA ABLOY FENESTRATION, LLC, Rochester, NY (US)

( * ) Notice: Subject to any disclaimer, the term of this patent is extended or adjusted under 35 U.S.C. 154(b) by 158 days.

(21) Appl. No.: 18/228,178

(22) Filed: Jul. 31, 2023

(65) Prior Publication Data

US 2024/0035321 A1 Feb. 1, 2024

Related U.S. Application Data

(60) Provisional application No. 63/394,084, filed on Aug. 1, 2022.

(51) Int. Cl.

| | |
|---|---|
| ***E05B 65/10*** | (2006.01) |
| ***E05B 65/00*** | (2006.01) |
| ***E05C 17/36*** | (2006.01) |

(52) U.S. Cl.
CPC ...... *E05B 65/0014* (2013.01); *E05B 65/1033* (2013.01); *E05C 17/36* (2013.01)

(58) Field of Classification Search
CPC ............. E05B 65/0014; E05B 65/1033; E05B 2015/0406; E05C 17/50; E05C 17/36; E05C 17/30; E05F 11/04
See application file for complete search history.

(56) References Cited

U.S. PATENT DOCUMENTS

| | | | | |
|---|---|---|---|---|
| 3,897,966 A * | 8/1975 | Draughon, Sr. | ...... | E05C 17/365 292/264 |
| 4,580,820 A * | 4/1986 | Baber | .................. | E05C 17/365 292/264 |
| 5,647,233 A * | 7/1997 | Chung | .................. | E05C 17/365 292/264 |

(Continued)

FOREIGN PATENT DOCUMENTS

| | | |
|---|---|---|
| CA | 2757154 A1 | 4/2012 |
| CA | 3014796 A1 | 3/2019 |

(Continued)

*Primary Examiner* — Justin B Rephann
(74) *Attorney, Agent, or Firm* — DeLio Peterson & Curcio LLC; David R. Pegnataro

(57) ABSTRACT

A window opening control assembly for releasably-limiting the maximum amount of travel of a window sash relative to a window frame includes a first component for attachment to one of the sash or frame, wherein the first component comprises a latch assembly including an actuator and a retainer, and a second component for attachment to the other of the sash or the window frame and comprising an at least partially flexible member that is extendable to the first component and releasably secured by the retainer. The at least partially flexible member is fed from the second component as distance between the first and second components increases until an intermediate position is reached and the components are restrained from further relative movement. The latch assembly is selectively unlatched to permit removal of the at least partially flexible member from the retainer to permit free movement between the first and second components.

20 Claims, 18 Drawing Sheets

(56) References Cited

U.S. PATENT DOCUMENTS

| | | | | |
|---|---|---|---|---|
| 5,669,256 | A * | 9/1997 | Chung | E05C 17/365 292/264 |
| 6,684,454 | B2 | 2/2004 | Ehrenreich | |
| 8,418,404 | B2 | 4/2013 | Gramstad et al. | |
| 8,424,246 | B2 | 4/2013 | Feng et al. | |
| 8,490,330 | B2 | 7/2013 | Lund et al. | |
| 8,505,240 | B2 | 8/2013 | Nguyen et al. | |
| 8,726,572 | B2 | 5/2014 | Derham | |
| 8,813,424 | B2 | 8/2014 | Nguyen et al. | |
| 9,115,529 | B2 | 8/2015 | Liang et al. | |
| 9,388,612 | B2 | 7/2016 | Liang et al. | |
| 9,428,945 | B2 | 8/2016 | Nguyen et al. | |
| 9,447,616 | B2 | 9/2016 | Leary et al. | |
| 9,670,705 | B2 | 6/2017 | Liang et al. | |
| 9,890,571 | B1 | 2/2018 | Marsden | |
| 10,174,530 | B2 | 1/2019 | Liang et al. | |
| 10,458,170 | B2 | 10/2019 | Vesca | |
| 10,570,646 | B2 | 2/2020 | Marsden | |
| 10,648,207 | B2 | 5/2020 | Doring | |
| 10,837,202 | B2 | 11/2020 | Andersen | |
| 11,060,330 | B2 | 7/2021 | Marsden | |
| 11,293,200 | B2 | 4/2022 | Andersen | |
| 2011/0173895 | A1 * | 7/2011 | Lund | E05F 11/04 49/501 |
| 2015/0089877 | A1 * | 4/2015 | Liang | E05C 17/02 49/386 |
| 2019/0078365 | A1 * | 3/2019 | Doring | E05C 17/24 |
| 2021/0002925 | A1 | 1/2021 | Andersen | |
| 2021/0372176 | A1 | 12/2021 | Martin et al. | |
| 2021/0404228 | A1 | 12/2021 | Derham | |
| 2025/0154806 | A1 * | 5/2025 | Carrier | E05C 17/32 |

FOREIGN PATENT DOCUMENTS

| | | | |
|---|---|---|---|
| WO | 2014108680 | A1 | 7/2014 |
| WO | 2017160261 | A1 | 9/2017 |
| WO | 2018051083 | A1 | 3/2018 |
| WO | 2019161973 | A1 | 8/2019 |
| WO | 2020037356 | A1 | 2/2020 |
| WO | 2021151995 | A1 | 8/2021 |

* cited by examiner

WINDOW OPENING CONTROL DEVICE

BACKGROUND OF THE INVENTION

1. Field of the Invention

The present invention relates generally to window locking assemblies which releasably limit the opening of the window sash to a predetermined distance with respect to the window frame. More specifically, the present invention relates to an improved window opening control device, such as for use with casement style windows, which is designed to meet the ASTM F2090-21 Standard for window fall prevention devices with emergency escape (egress) release mechanisms.

2. Description of Related Art

Windows include an operable sash which can be opened for ventilation of a room. However, when such windows are used in multi-story buildings or homes, or more generally in buildings or homes above the first floor, open windows can pose a risk to certain groups of people, such as children five years old or younger, who may crawl or fall out of the open window. Depending on the height at which the window is installed, windows installed on a first floor could also cause a child to fall a considerable distance and suffer injury. Window opening control devices (WOCD) are devices that limit or restrict the degree of opening of the window so that it is too small for a child to fall through. Generally, WOCDs allow an intermediate window opening position to be set at a predetermined distance which is less than a full opening of the window sash, wherein the WOCD limiting mechanism is releasable for emergency escape or egress.

American Society of Testing and Materials (ASTM) F2090-21 Standard for Window Fall Prevention Devices with Emergency Escape (Egress) Release Mechanisms specifies that "[w]indow fall prevention screens or fall prevention window guard devices shall be constructed so as to prohibit the free passage of a 4.0-in. (102-mm) diameter rigid sphere anywhere in the window opening (as required by applicable codes for that jurisdiction)." Moreover, such devices "shall be designed with release mechanisms to allow for emergency escape (egress) without the need for special tools or special knowledge," where the release mechanism requires "two distinct actions to operate"—which may consist of either two independent single action mechanisms or one dual action mechanism—and such devices shall automatically re-engage upon closing of the window. See Section 4.1 supra.

Known WOCD assemblies have disadvantages. For example, some WOCD assemblies can be easily manipulated by children, resulting in the ability to bypass or override the intended fall prevention function. Further, many known WOCD assemblies can interfere with the proper closing of the window assembly to which they are attached, or are simply not aesthetically pleasing. Known WOCD assemblies having rigid limiting elements are also prone to failure after a period of time and/or repeated use. Prior WOCD assemblies, although fairly prevalent in the field, are also not typically used on casement style windows.

Therefore, there is a need for an improved WOCD assembly which reduces complexity of manufacture and installation time, as well as increases ease of use, particularly when used in connection with casement style windows.

SUMMARY OF THE INVENTION

Bearing in mind the problems and deficiencies of the prior art, it is therefore an object of the present invention to provide an improved WOCD assembly which includes a flexible or partially flexible limiting element to restrict the amount of travel of the window sash with respect to the frame.

It is another object of the present invention to provide an improved WOCD assembly which is concealed by the window frame when the window assembly is in a closed position, so as to be aesthetically pleasing.

A further object of the present invention is to provide an improved WOCD assembly which cannot be easily overridden or bypassed by children.

Still other objects and advantages of the invention will in part be obvious and will in part be apparent from the specification.

The above and other objects, which will be apparent to those skilled in the art, are achieved in the present invention which is directed to a window opening control assembly for releasably-limiting the maximum amount of travel of a window sash relative to a window frame. The window opening control assembly includes a first component for attachment to one of the sash or frame, wherein the first component comprises a latch assembly including an actuator and a retainer, the actuator including a button release portion and an integral gate portion and being normally biased in a first direction to block an opening of the retainer. In an embodiment, the actuator button release portion and gate portion move in tandem and do not move independently of one another. The window opening control assembly further includes a second component for attachment to the other of the sash or frame and comprising an at least partially flexible member that is extendable to the first component. The at least partially flexible member may comprise a cable, rope, line, tape, wire, ribbon, cord, or similar retractable element. The at least partially flexible member is releasably secured by the latch assembly and fed from the second component as the distance between the first and second components increases until an intermediate position is reached and the first and second components are restrained from further relative movement. The retainer releasably secures the at least partially flexible member within the latch assembly and the latch assembly is selectively unlatched to permit removal of the at least partially flexible member from the latch assembly to permit free movement between the first and second components.

In at least one embodiment, the retainer aligns and secures the at least partially flexible member at the latch assembly when the first component and second component are moved adjacent to one another. The actuator may be a rotary actuator movable in a second direction opposite the first direction to cause the gate portion to cease blocking the retainer and permit removal of the at least partially flexible member from the retainer. The at least partially flexible member may include a terminal end comprising an anchor that is adapted to be captured by the retainer to prevent removal until the latch assembly is selectively unlatched, wherein the retainer may align the at least partially flexible member at the latch assembly as the retainer receives the anchor.

In one or more embodiments, the first component may further comprise a body and a lifter element proximate the actuator and at least partially extending above a top surface of the body, and a retraction mechanism for automatically retracting the at least partially flexible member into the second component when the latch assembly is selectively unlatched. In at least one embodiment, the retraction mechanism may be a constant force spring. The second component may further comprise an elongated body having a channel extending along a longitudinal axis thereof and include a stop for setting an effective length of the at least partially flexible member as it extends to the first component, wherein the longitudinal position of the stop is adjustable within the channel.

In another aspect, the present invention is directed to a method of operating a window assembly, comprising moving a first component attached to one of a sash or a frame of the window assembly to a position adjacent a second component attached to the other of the sash or the frame, the first component comprising a latch assembly including an actuator and a retainer, the actuator including a button release portion and an integral gate portion and being normally biased in a first direction to block an opening of the retainer, and the second component comprising an at least partially flexible member that is extendable to the first component; securing a portion of the at least partially flexible member within the retainer as the first component approaches the second component; and feeding the at least partially flexible member from the second component as the sash is moved away from the frame until the sash reaches an intermediate position and the sash is restrained from further movement away from the frame. To release the window assembly, the method includes causing the actuator to move in a second direction opposite the first direction to cause the gate portion to cease blocking the retainer and permit removal of the at least partially flexible member; selectively translating the at least partially flexible member past the actuator gate portion to exit the retainer; and continuing to move the sash away from the frame.

In an embodiment, the second component includes a retraction mechanism for automatically retracting the at least partially flexible member into the second component when the latch assembly is selectively unlatched and further comprises an elongated body having a channel extending along a length thereof and a socket at one end of the channel, wherein the at least partially flexible member extends within the channel along the length of the body, and the method further includes the step of retracting the at least partially flexible member into the second component body until a terminal portion of the at least partially flexible member extends outwardly from an opening of the socket.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

As shown in FIGS. 1-5, this component is the sash side component.

As shown in FIGS. 1-5, this component is the frame side component.

DESCRIPTION OF THE EMBODIMENT(S)

Figure 1:
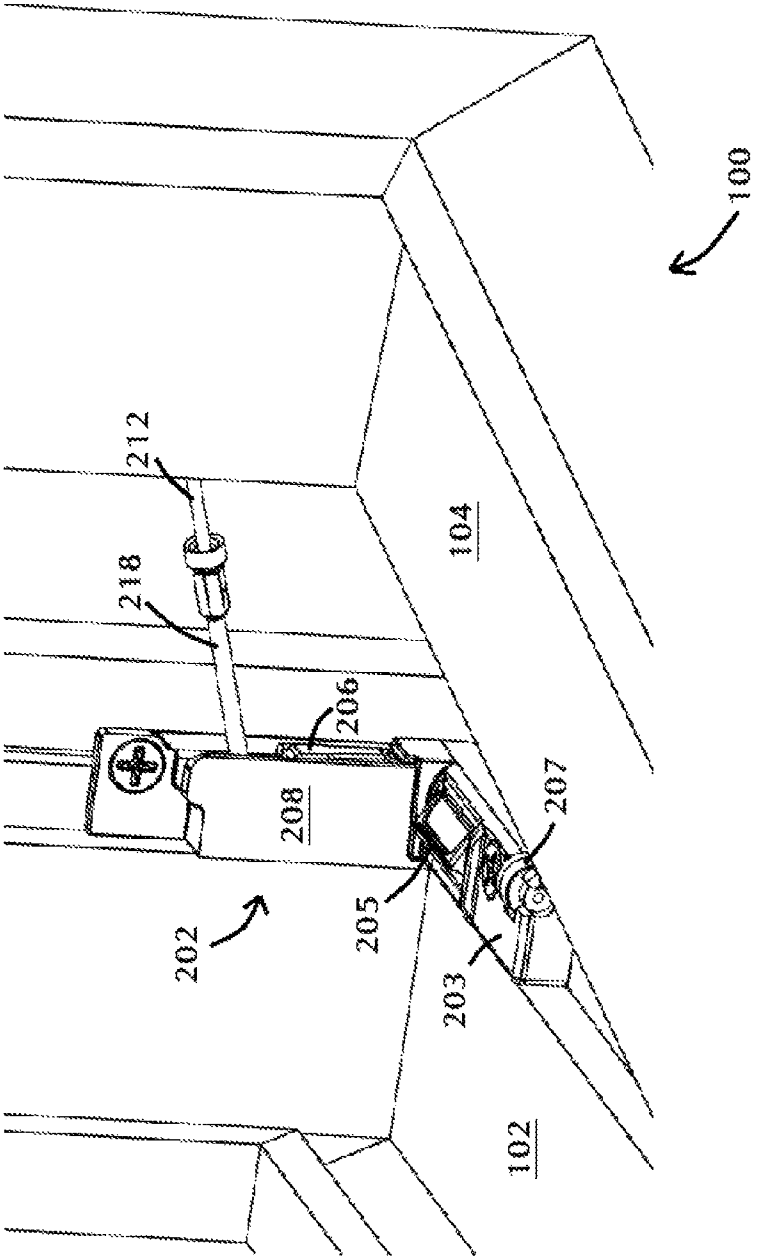
FIG. 1 is a front perspective view of a window assembly including a window opening control assembly (WOCD) according to an embodiment of the present invention, with the window assembly in an intermediate, window opening-limiting position.

In describing the embodiments of the present invention, reference will be made herein to FIGS. 1-23 of the drawings, in which like numerals refer to like features of the invention.

Certain terminology is used herein for convenience only and is not to be taken as a limitation of the invention. For example, words such as "upper," "lower," "left," "right," "horizontal," "vertical," "upward," "downward," "clockwise," "counterclockwise," "longitudinal," "lateral," "radial," or variants thereof, merely describe the configuration shown in the drawings. Indeed, the referenced components may be oriented in any direction and the terminology, therefore, should be understood as encompassing such variations unless specified otherwise. For purposes of clarity, the same reference numbers will be used in the drawings to identify similar elements.

Additionally, in the subject description, the words "exemplary," "illustrative," or the like are used to mean serving as an example, instance or illustration. Any aspect or design described herein as "exemplary" or "illustrative" is not necessarily intended to be construed as preferred or advantageous over other aspects or design. Rather, use of the words "exemplary" or "illustrative" is merely intended to present concepts in a concrete fashion.

Embodiments of a window opening control device (WOCD) assembly according to the present invention are shown in FIGS. 1-23, inclusive. The WOCD assembly is designed to meet the ASTM F2090-21 Standard for Window Fall Prevention Devices with Emergency Escape (Egress) Release Mechanisms, which requires that the opening of the window be releasably limited to four inches or less on the installed window, and further requires, inter alia, a two-action operation to release the limiting element or latch assembly, and automatic engagement/re-engagement of the latch assembly upon closing of the window. The WOCD assembly of the present invention comprises a first component including a flexible or at least partially-flexible member for engaging a latch assembly on an adjacent second component when the window is moved from a closed position toward an open position, and a second component comprising the latch assembly and including an actuator and a retainer for releasably receiving a portion of the flexible or partially-flexible member to limit the opening of the window to a predetermined range. In at least one embodiment, the first component is coupled to the window sash of the window assembly and the second component is coupled to the window frame of the window assembly. In an exemplary embodiment, the WOCD assembly installs on a standard 7/16-inch 2 Bar Hinge screw line on both the sash and frame and is handed, requiring both left- and right-hand assembly. It should be understood by those skilled in the art that the WOCD assembly of the present invention can be adapted to be installable on a standard 4 Bar Hinge screw line by scaling the size of the components.

Referring now to FIGS. 1-5, an illustrative embodiment of a window assembly 100 including a window opening control device (WOCD) assembly 200 according to an embodiment of the present invention is shown. Window assembly 100 is shown as, but is not limited to, a casement style window which operates with a rotatable sash that rotates about a vertical axis. It should be understood by those skilled in the art that the WOCD assembly of the present invention is not limited to uses on casement style windows, and that other applications are not precluded, such as in connection with awning or push-out windows, sliding doors, swinging doors, patio doors, roof access doors, and the like, including where installation of the WOCD assembly may be along a horizontal axis. Window assembly 100 includes a frame 102 and a sash 104 that is rotatably coupled relative to frame 102 about a vertical axis. WOCD assembly 200 is coupled with the frame 102 and sash 104 and configured to limit the opening or amount of travel of the sash relative to the frame to a predetermined distance, but is releasable by a two-action operation to permit opening of the sash to a plurality of positions, up to and including a full opening of the sash.

Figure 2:
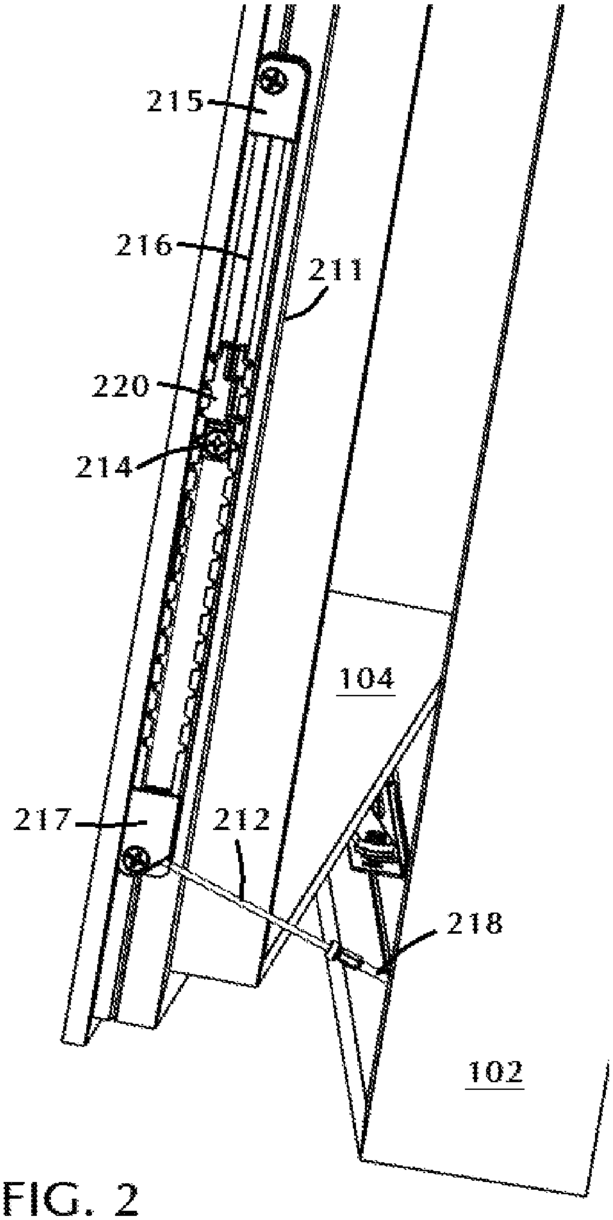
FIG. 2 is a rear perspective view of the window assembly of FIG. 1.
Figure 3:
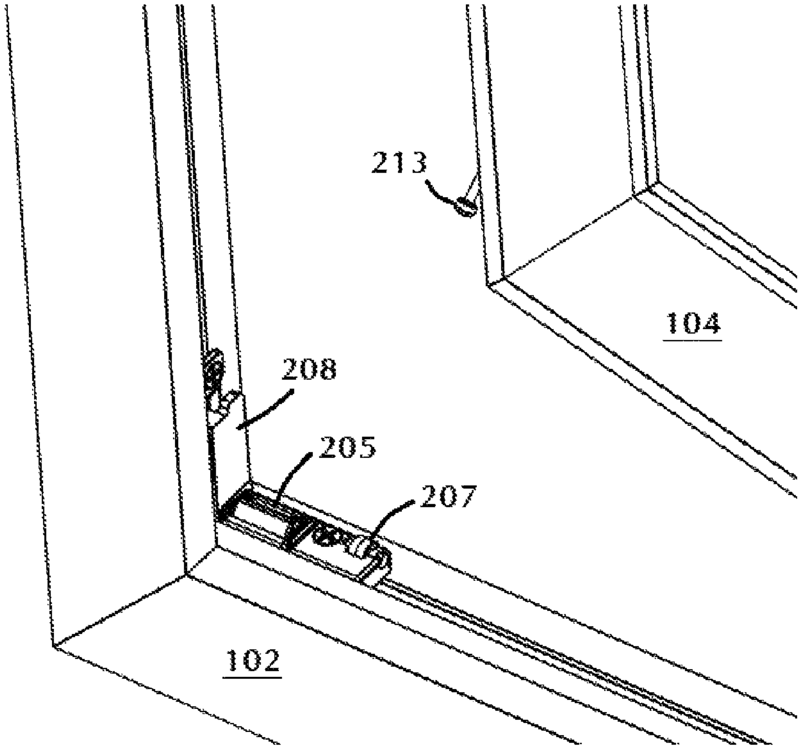
FIG. 3 is a front perspective view of the window assembly of FIGS. 1-2, with the window assembly in a window sash approaching position.
Figure 4:
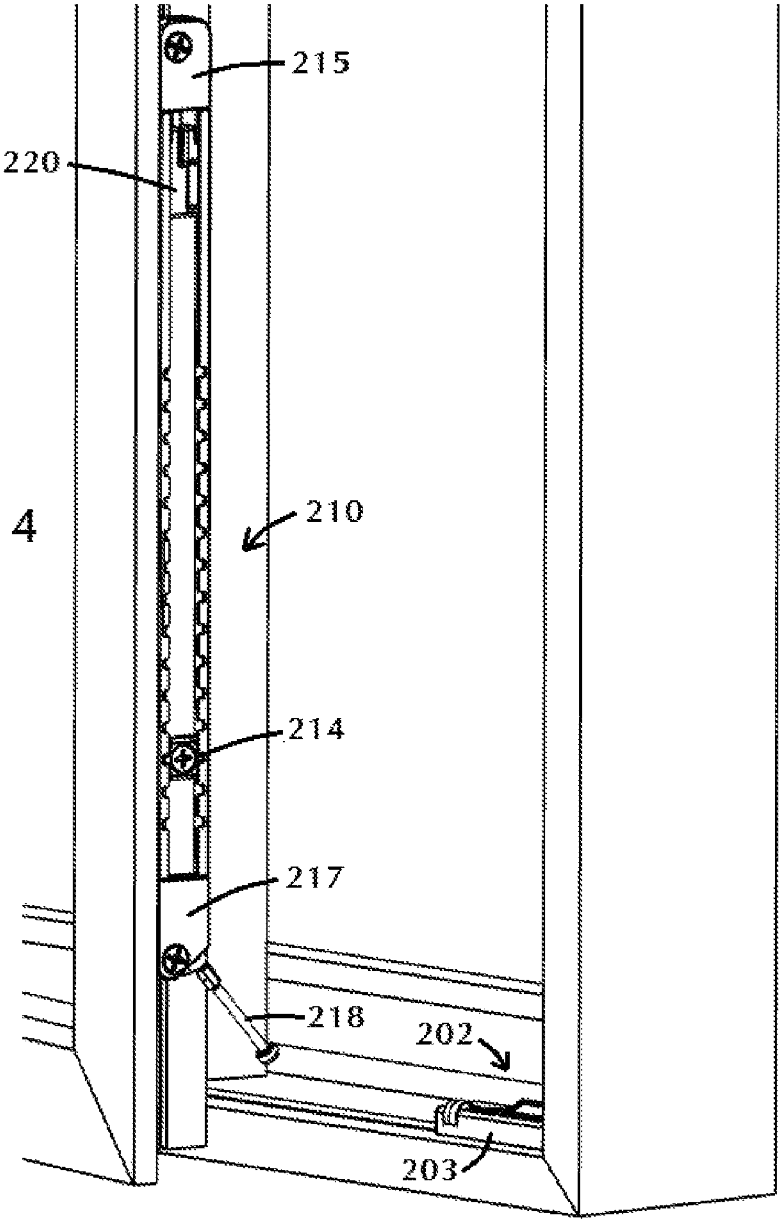
FIG. 4 is a rear perspective view of the window assembly of FIG. 3.
Figure 5:
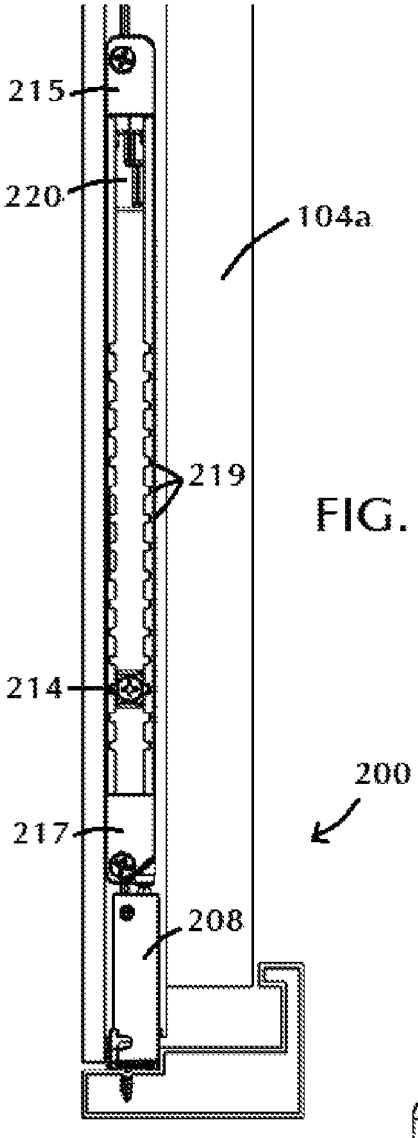
FIG. 5 is a side plan view of the window assembly of FIG. 1, with the window assembly in a closed position. A lateral edge portion of the window frame is not shown, to more clearly depict the positions of the components of the window opening control assembly.

FIGS. 1-2 show window assembly 100 in an opening-limited position, as constrained by WOCD assembly 200. FIGS. 3-4 show window assembly 100 in a sash-approaching position, with WOCD assembly 200 oriented for automatic engagement upon closing of the sash. FIG. 5 shows window assembly 100 in a closed position.

WOCD assembly 200 includes a first component 210 for attachment to one of the window sash 104 or window frame 102, and a second component 202 for attachment to the other of the sash or frame. As shown in FIGS. 1-5, WOCD assembly first component 210 may be secured to sash 104, and second component 202 may be secured to frame 102. A flexible or partially flexible member, such as a cable 212, extends from the first component 210 and is engageable with the second component 202 to restrict the opening of the sash 104 relative to the frame 102 (FIGS. 1-2). It should be understood by those skilled in the art that flexible member 212 is not limited to a cable, and that other flexible or partially flexible elements are not precluded, such as a rope, line, tape, wire, ribbon, cord, or similar retractable element. Generally, as the sash 104 is opened, cable 212 is fed from the first component 210 as the first component is moved away from the second component 204 until a cable connector 220 attached at a fixed end of the cable reaches an adjustable cable stop 214, thereby preventing further extension of the cable and movement of the sash away from the frame and restricting the travel of the sash relative to the frame to a desired distance, as will be described in more detail below.

As shown in the Figures herein, first component 210 is attached to sash 104 and second component 202 is attached to frame 102; however, it should be understood by those skilled in the art that in other embodiments, the first and second components 210, 202 may be reversed such that the first component 210 is coupled to the frame 102 and the second component 202 is coupled to the sash 104, respectively, without departing from the principles of operation of the present invention.

Figure 9:
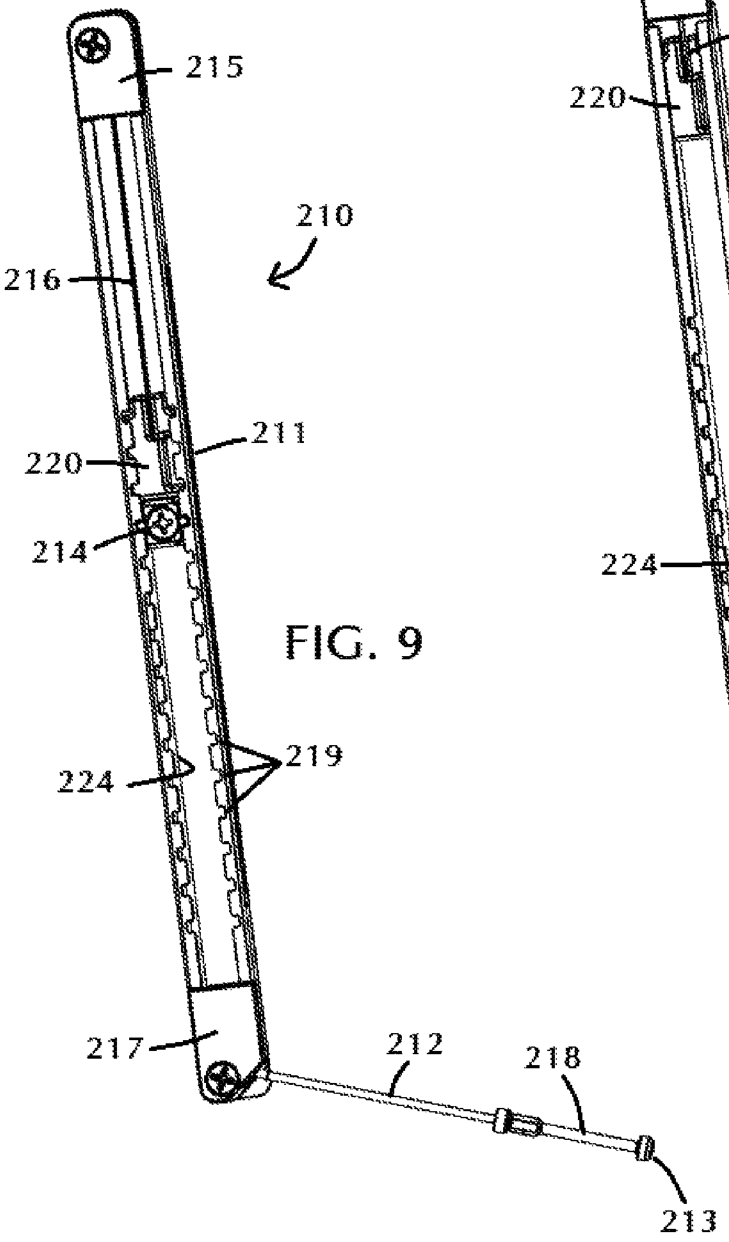
FIGS. 9 and 10 are perspective views of one component of a WOCD assembly according to an embodiment of the present invention, with the flexible member in extended and retracted positions, respectively.
Figure 10:
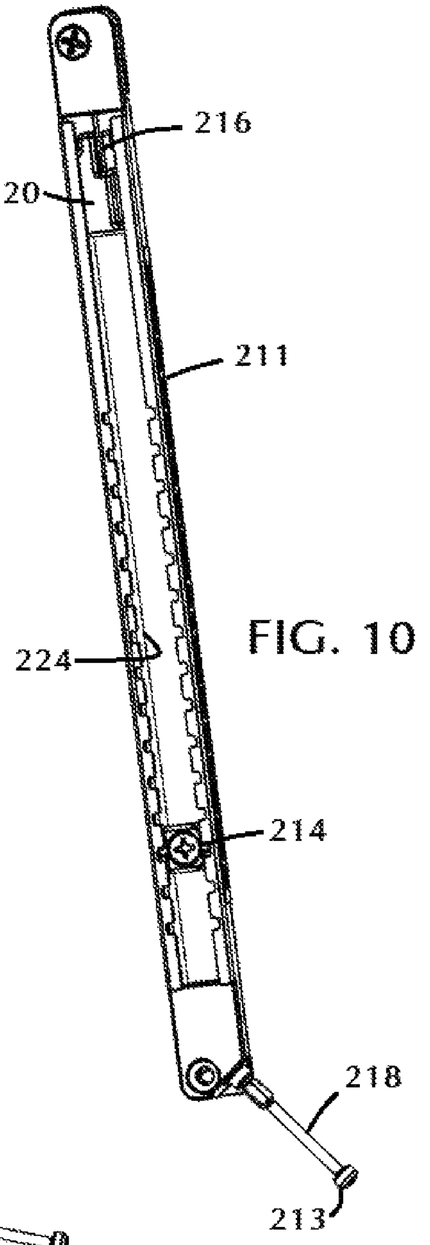
Figure 11:
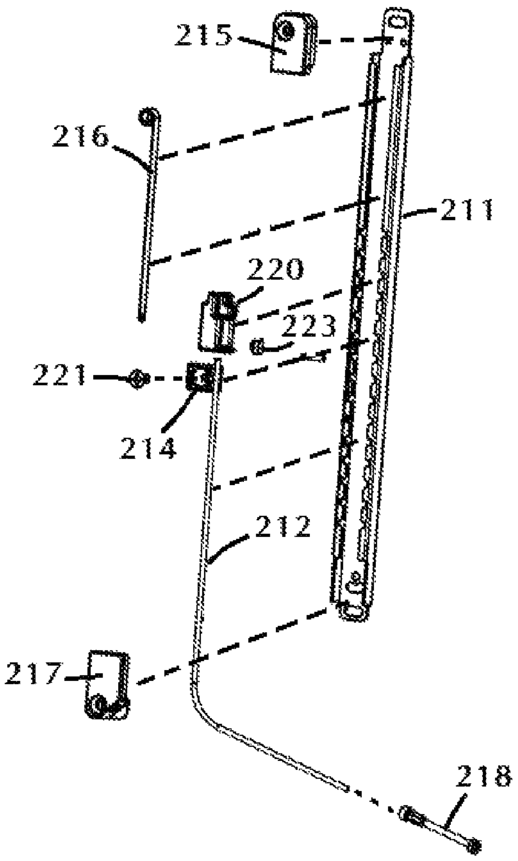
FIG. 11 is an exploded view of the component shown in FIGS. 9-10.

One embodiment of a first component 210 of the WOCD assembly 200 is shown in FIGS. 9-13, inclusive. First component 210 comprises an elongated body 211 for attachment to a window sash or window frame by otherwise conventional means, such as via fasteners (shown in FIGS. 9-10 as Phillips head screws) extending through body 211 and into the surface of the sash or frame. As best seen in FIGS. 9-10, body 211 may comprise an elongated channel 224 within which flexible or partially flexible member or cable 212 extends along the length of the body. At one end of channel 224, cable 212 extends through socket 217 and out of body 211 for releasable attachment to the second component 202. As shown in FIGS. 9-10, cable 212 includes a terminal portion comprising an anchor end 213 which extends out from first component body 211 when the cable is in a retracted position and may include an over molded protector 218 comprising a compliant material molded over a portion of the exterior of the cable for providing stiffness and flexibility. It should be understood by those skilled in the art that, in one or more embodiments, protector 218 may instead be an elongated rigid section which defines the terminal portion of partially flexible member 212 to provide necessary stiffness. Stiffness is needed when the cable 212 is in a retracted position to ensure proper alignment of the anchor end 213 with the retainer 208 of the second component 202 when the window is moved to a closed position. The flexibility allows for bending and movement of the cable 212 through the range of positions, as well as disbursement and reduction of stress on the cable itself during operation. The terminal portion of the cable, which may comprise protector 218 and anchor 213, and which extends outwardly from an opening of socket 217 when in a retracted position, acts as both a leading anchor point and a touch point for unlatching the latch assembly.

During operation of the window assembly 100, as the sash 104 is opened, cable 212 is fed from the first component 210 as the first component is moved away from the second component 204 until the end of the flexible member or cable 212 is anchored within a retainer 208 of the second component 202 and the first component 210 is correspondingly prevented from further movement away from the second component 202, anchoring the sash 104 in a partially-open position.

Figure 12:
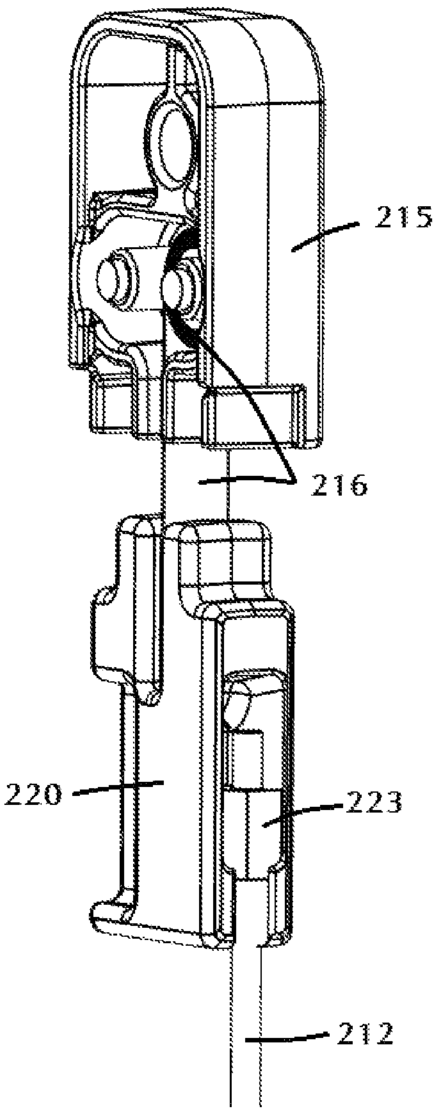
FIG. 12 is a rear perspective view of the interconnection of the spring housing, cable connector and cable of the component shown in FIG. 9.
Figure 13:
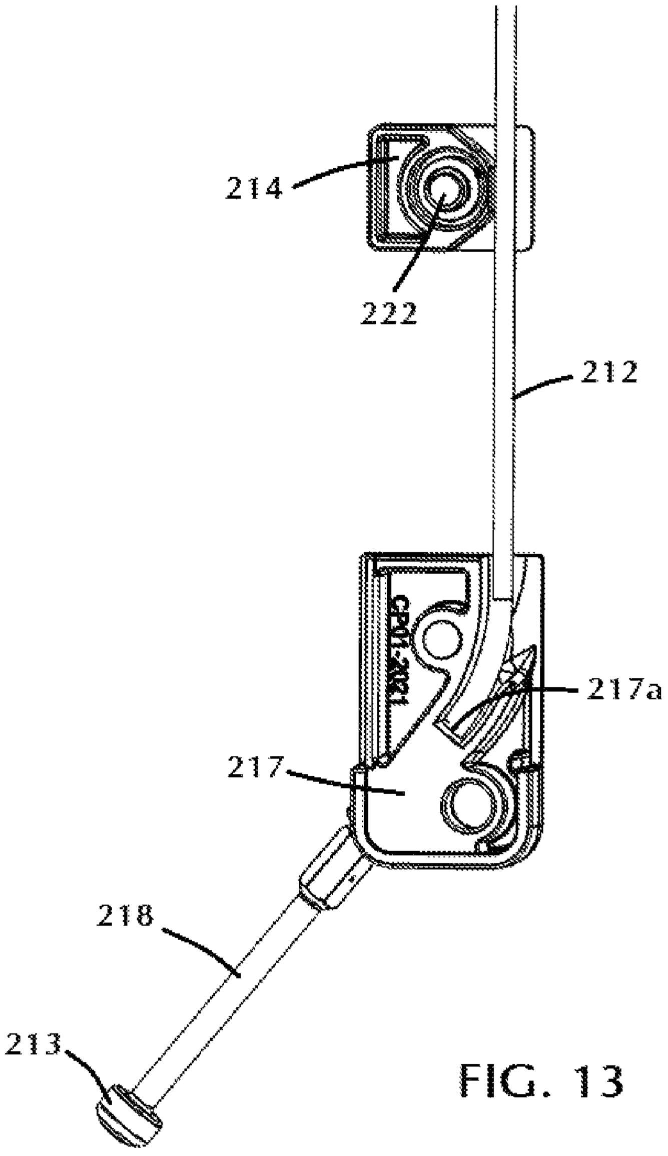
FIG. 13 is a rear perspective view of the interconnection of the cable stop, socket and cable of the component shown in FIG. 9.

As best seen in FIG. 12, within housing 215 at an opposite end of the channel 224 is positioned spring 216, which may be a constant force spring, and is attached to or integral with a cable connector 220 at a fixed end of cable 212 via cable nut 223. Spring 216 keeps constant backpressure, allowing cable 212 (via cable connector 220) to extend and retract during operation of the window assembly 100. When cable end 213 is released, spring 216 fully retracts the cable 212 and aligns the cable within socket channel 217*a*, leaving the terminal portion of the cable including cable end 213 extending outwardly from socket 217 to allow for proper engagement with the retainer 208 of the second component 202 when the window sash is moved to a closed position (FIG. 13).

As can be seen by comparison of FIGS. 9 and 10, as the cable 212 is extended as the sash moves away from the frame, connector 220 travels within body 211 until it reaches cable stop 214. Cable stop 214 allows for adjustment of the effective cable length, allowing for variations between window designs and sizing while still permitting a window opening limit of four (4) inches or less in accordance with the ASTM F2090-21 Standard, with the same hardware. To adjust the effective cable length to accommodate for variations in window design and sizing, cable stop 214 is adjustable within the body 211 along a longitudinal axis via placement at a desired distance from socket 217 by way of a plurality of opposing slotted portions 219 along channel 224. As shown for example in FIG. 11, cable stop 214 is secured at a desired height via fastener 221 extending through body 211 and received by nut 222. The higher the cable stop is positioned along the longitudinal axis of the channel 224, the less extension of the cable 212 is permitted, thereby decreasing the maximum distance of travel of the sash relative to the frame. It should be understood by those skilled in the art that, as used herein, "height" refers to a position along the longitudinal axis when body 211 is oriented vertically, and that similarly, if body 211 is oriented horizontally, the distance between cable stop 214 and socket 217 also determines the effective length of the cable when fed from body 211.

Figure 17:
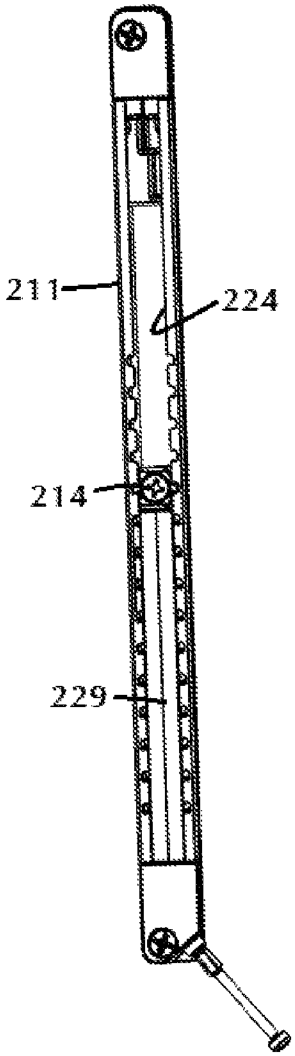
FIG. 17 is a perspective view of another embodiment of an adjustable sash component of a WOCD assembly according to the present invention.
Figure 18:
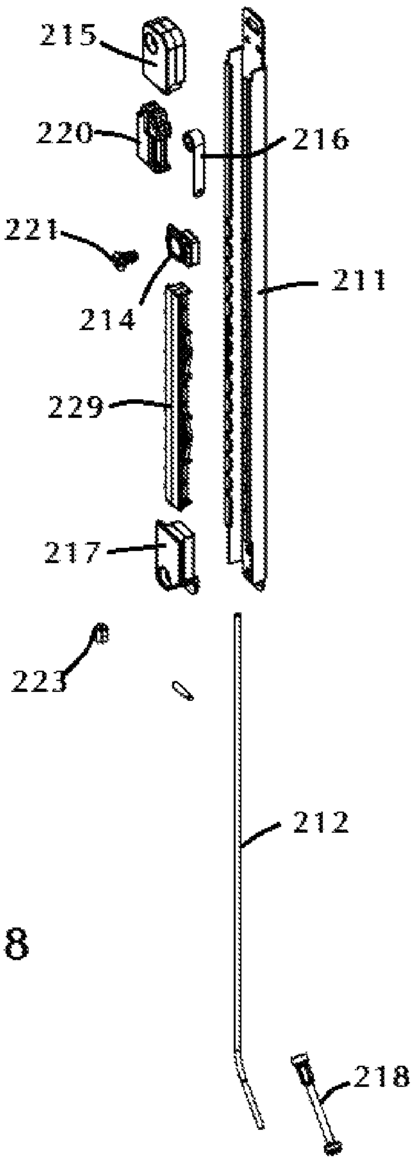
FIG. 18 is an exploded view of the sash component of FIG. 17.

In one or more embodiments, an adjustment block or insert 229 may be installed and positioned within channel 224 to ensure proper alignment of the cable stop 214, as shown in FIGS. 17-18. As best seen in FIG. 17, adjustment block 229 may be disposed between cable stop 214 and socket 217 to ensure that cable stop 214 does not shift or translate downward within channel 224 thereby increasing the effective cable length that is permitted to be fed from the component 210. Adjustment block 229 may be manufactured in varying lengths to accommodate windows of different sizes, in order to maintain the required spacing under ASTM F2090-21.

Figure 19:
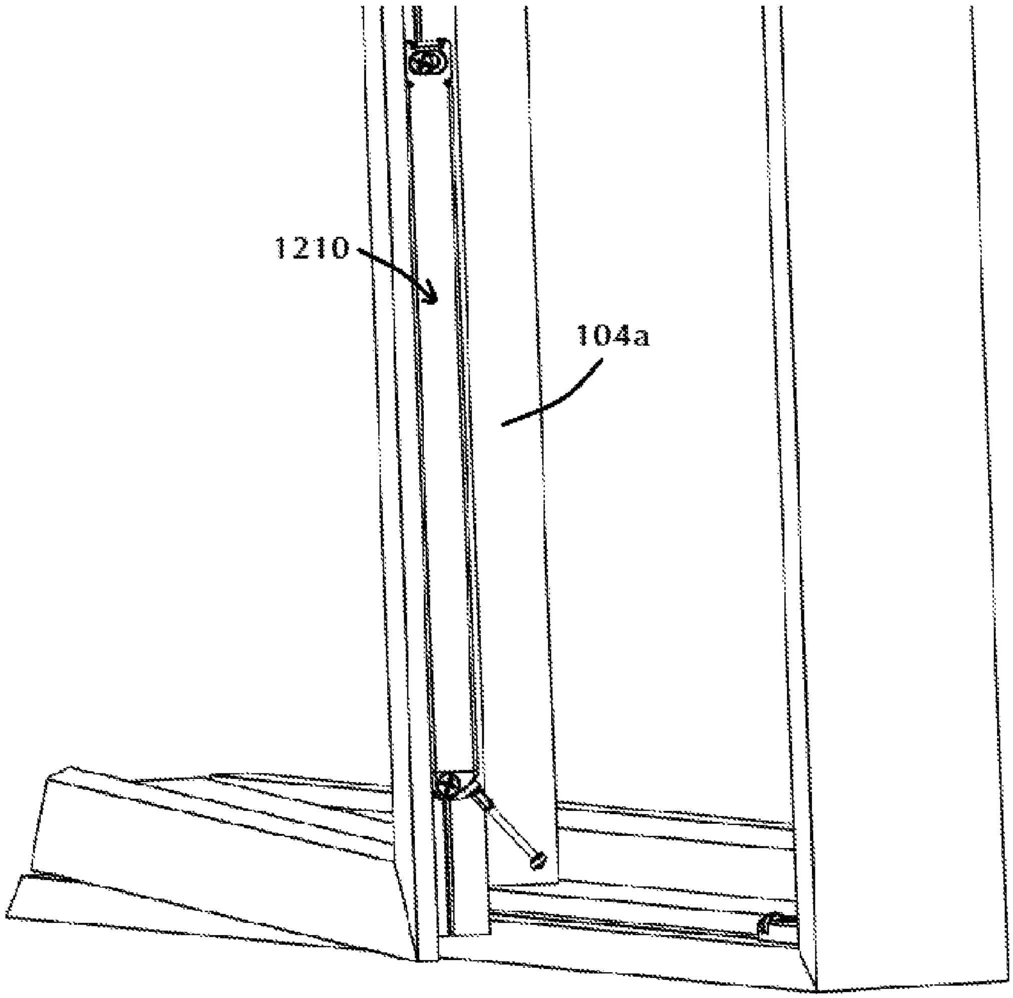
FIG. 19 is a front perspective view of a window assembly including another embodiment of a window opening control assembly (WOCD), with the window assembly in a window sash approaching position.
Figure 20:
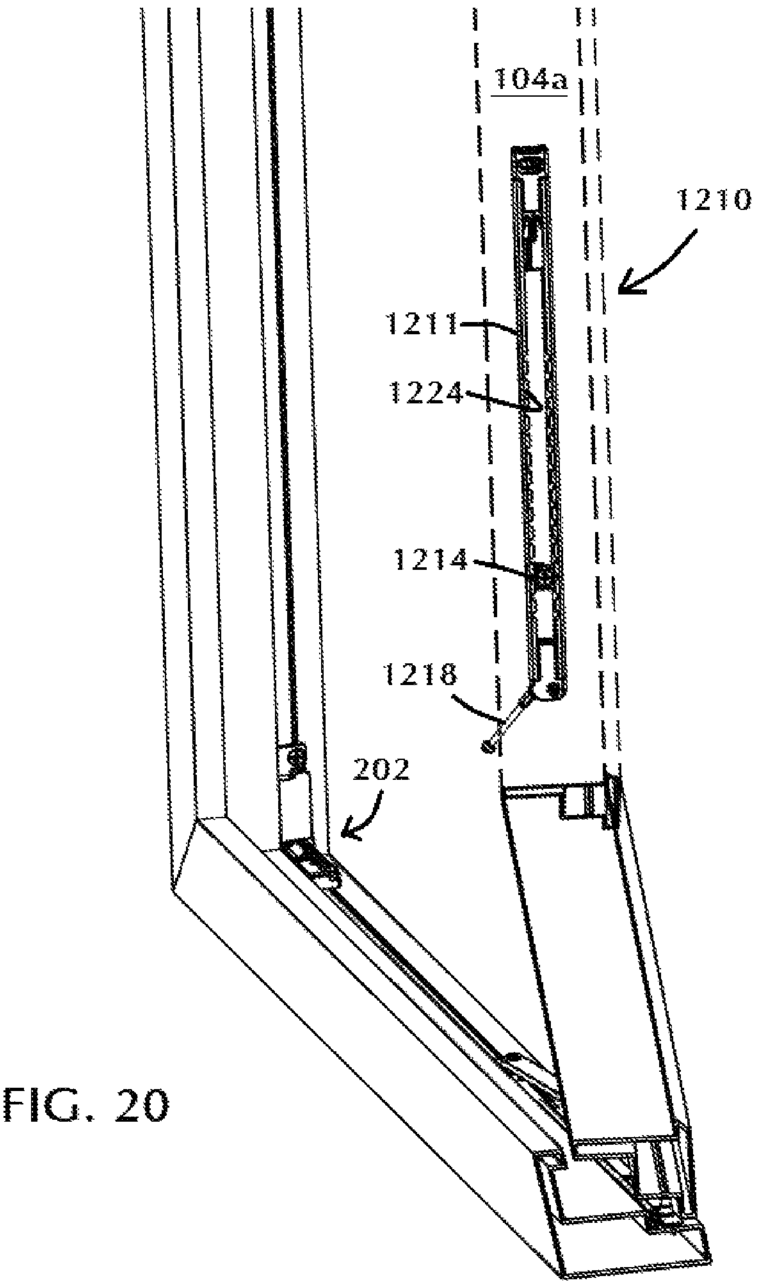
FIG. 20 is a rear perspective view of the window assembly of FIG. 19. The upright portion of the window sash is shown in transparent form, so as to more clearly depict the orientation of the sash component of the WOCD assembly.

In the embodiment shown in FIGS. 9-13 and 17-18, adjustment of cable stop 214 within body 211 is permitted even after installation of the WOCD assembly to the window, as the cable stop and channel 224 are accessible to the end user when the window assembly is in any position other than a closed position. It should be understood by those skilled in the art that in other embodiments, such as shown in FIGS. 19-20, body 1211 may be reversed or flipped such that channel 1224 faces in an opposite direction, that is, toward the hinged side of the window assembly (FIG. 20), concealing the channel and cable stop 1214 against the outer face of the upright portion 104*a* of the sash 104. In such an embodiment, adjustment of the cable length is performed prior to installation, and further adjustment by the end user after installation is precluded or at least significantly limited absent removal of component 1210 from the sash.

An advantage of the embodiment shown in FIGS. 19-20 is that constant force spring 216 is concealed from weather elements or other external factors when the window is in the open position, preventing deterioration of the spring. For example, constant force springs are susceptible to failure when exposed to brick wash or other acidic substances, and therefore in window assemblies installed on or adjacent to brick walls, the risk of deterioration or failure of spring 216 under these conditions is significantly lessened, if not entirely eliminated.

Figure 21:
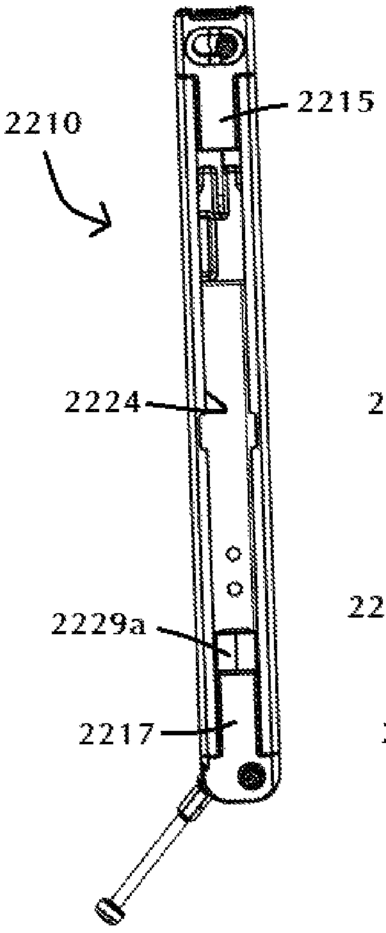
FIGS. 21-23 are rear plan views of embodiments of non-adjustable sash components of a WOCD assembly according to the present invention.
Figure 22:
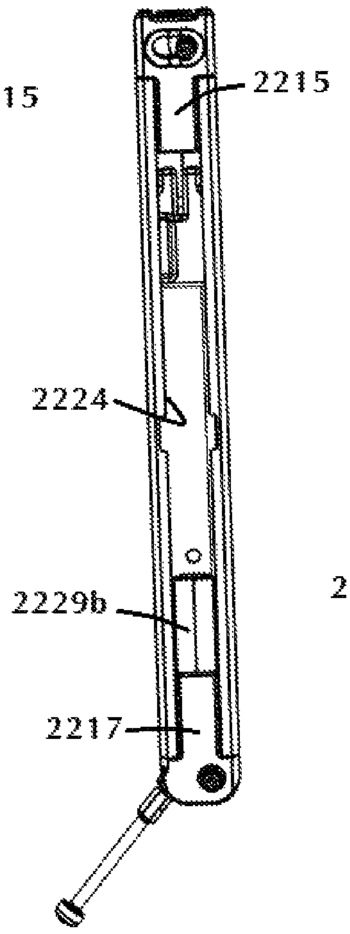
Figure 23:
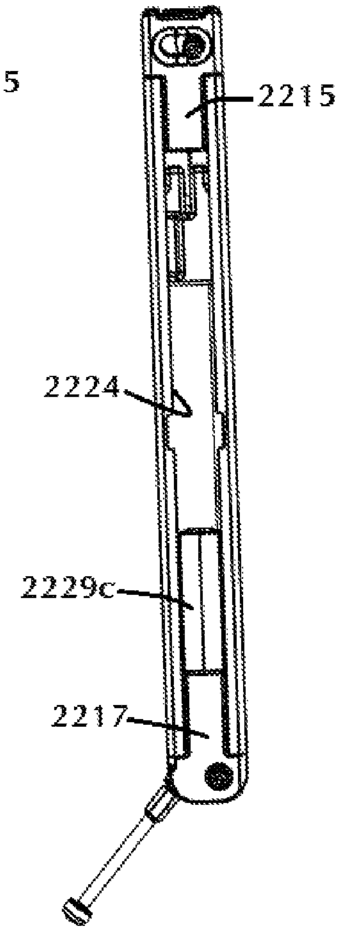

Embodiments of the WOCD assembly of the present invention also include fixed or non-adjustable sash components, as shown in FIGS. 21-23, where the effective cable length is set during manufacture and fixed via a non-adjustable stop axially positioned along the longitudinal axis of body 2211. FIGS. 21-23 depict sash components 2210 including fixed stops 2229*a*, 2229*b*, 2229*c* of increasing lengths to correspond to cables having different desired effective lengths. Similar to the previous embodiments, as the cable 212 is extended as the sash moves away from the frame, connector 2220 travels within body channel 2224 until it reaches stop 2229*a*, 2229*b*, or 2229*c*, thereby setting the effective cable length. To adjust the effective cable length to accommodate for variations in window design and sizing, a shorter or longer stop is used. The longer the stop, the less extension of the cable 212 is permitted, thereby decreasing the maximum distance of travel of the sash relative to the frame. As shown in in the examples of FIGS. 21-23, the cable of FIG. 23 would have the shortest effective cable length when fed from socket 2217, while the cable of FIG. 21 would have the longest, that is, the maximum distance of travel of the sash relative to the frame would be greatest in the embodiment of FIG. 21.

Figure 8:
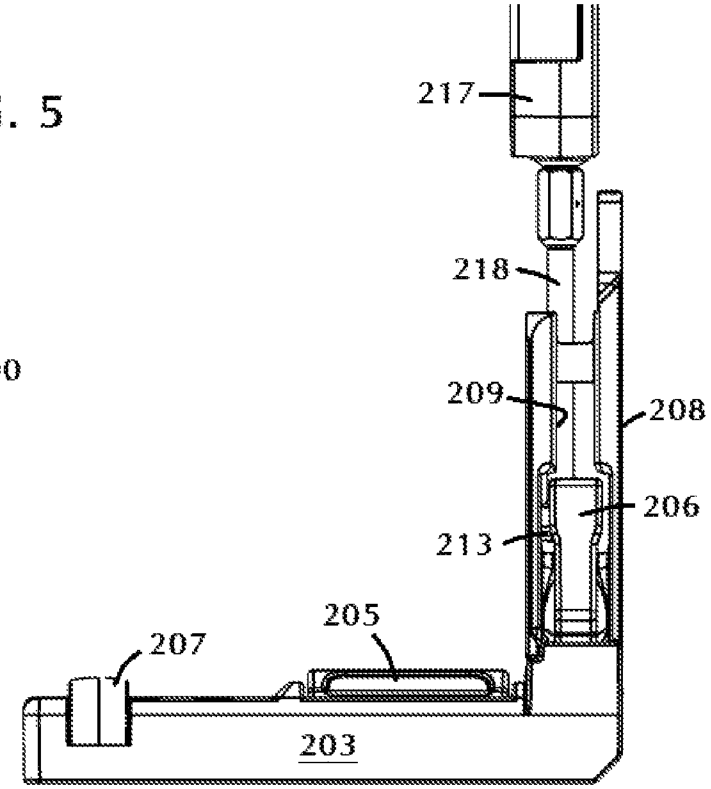
FIG. 8 is a plan view of the WOCD of FIG. 6, with the WOCD in a window-closed position.
Figure 6:
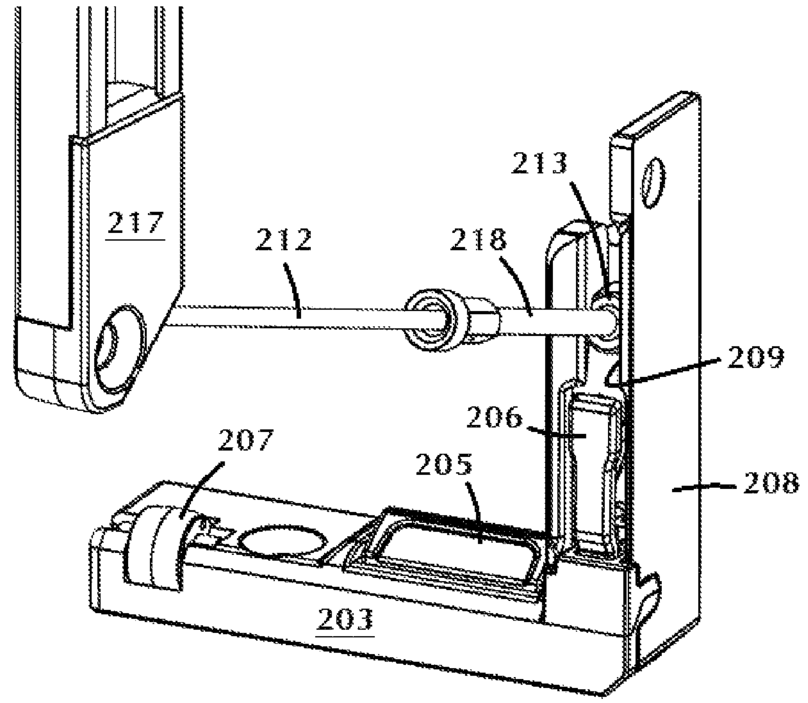
FIG. 6 is a perspective view of a window opening control assembly according to an embodiment of the present invention, with the WOCD in an intermediate, window opening-limiting position
Figure 14:
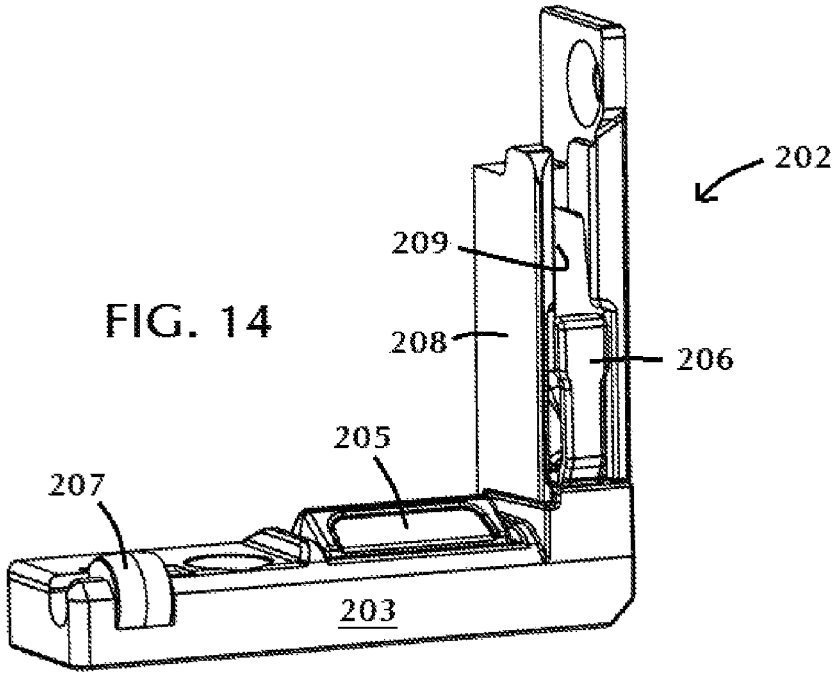
FIG. 14 is a perspective view of a second component of a WOCD assembly according to an embodiment of the present invention.
Figure 15:
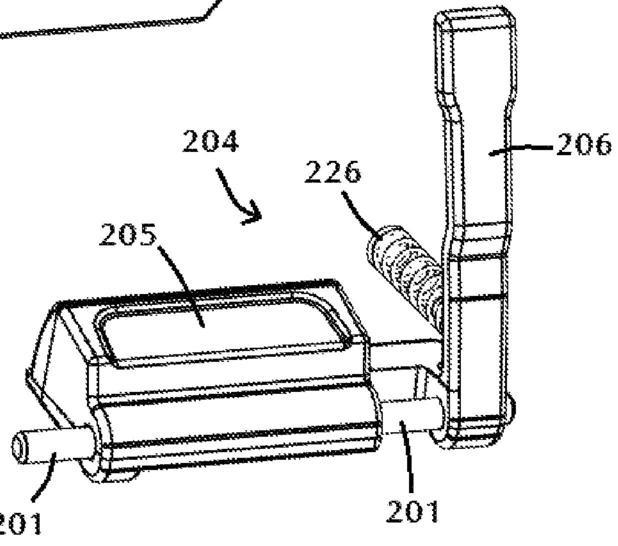
FIG. 15 is a perspective view of the actuator of the component shown in FIG. 14.
Figure 16:
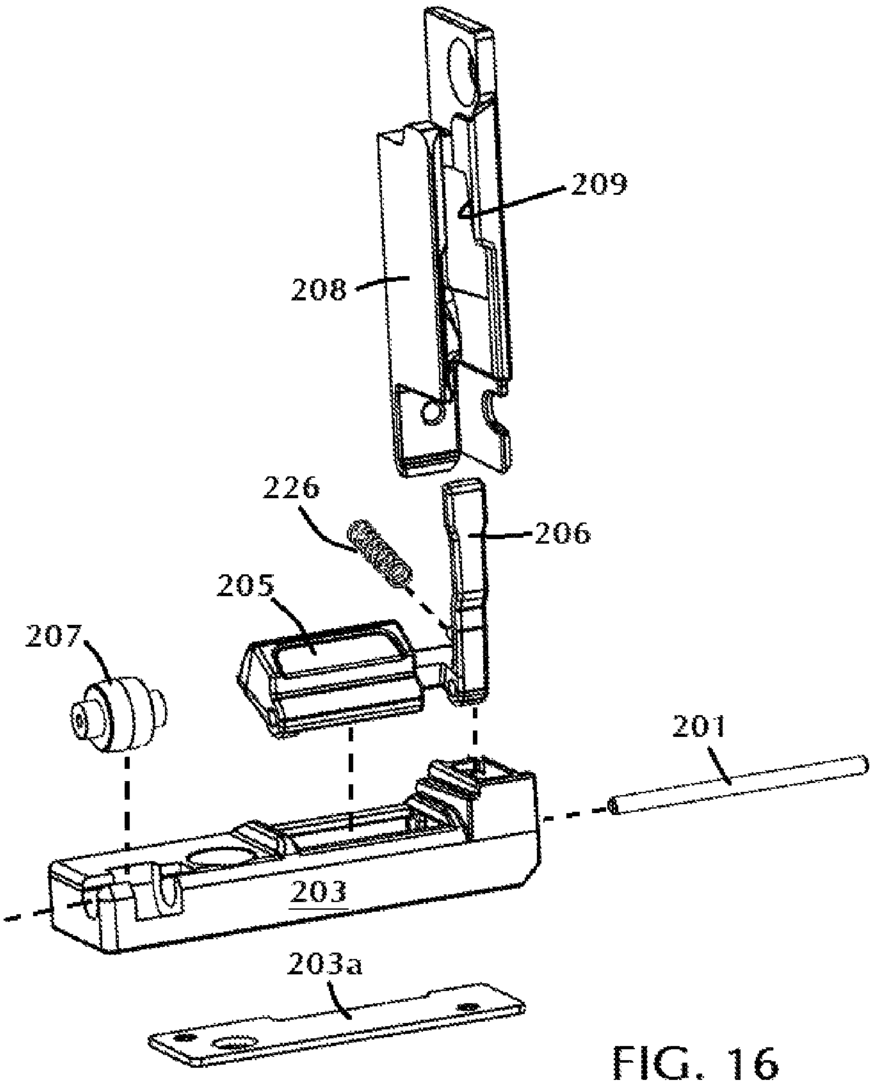
FIG. 16 is an exploded view of the component shown in FIG. 14.

Referring now to FIGS. 14-16, one embodiment of the second component 202 of WOCD assembly 200 is shown. Second component 202 may comprise a body 203 for attachment to the other of the window sash or window frame and a latch assembly comprising an actuator 204 and a retainer 208 for releasably-receiving an end 213 of flexible or partially-flexible element or cable 212 (FIGS. 6, 8, and 14). Retainer 208 accepts and holds the cable end 213, acting as both a funnel and an anchor point.

As best seen in FIGS. 15 and 16, actuator 204 may be a molded unitary component comprising a button release portion 205 and a gate portion 206, and is pivotable about a longitudinal axis 201 in the direction of the opening 209 of the retainer 208. As such, the button release portion 205 and gate portion 206 pivot in tandem and cannot move independently of one another. The actuator 204 can only act in one direction, relying on spring 226 to return the actuator to its default position. The actuator gate portion 206 allows the cable end 213 to enter the retainer opening 209 but does not allow the cable end to exit without mechanically moving the gate portion out of the path of travel, as shown for example in FIGS. 6 and 8.

Figure 7:
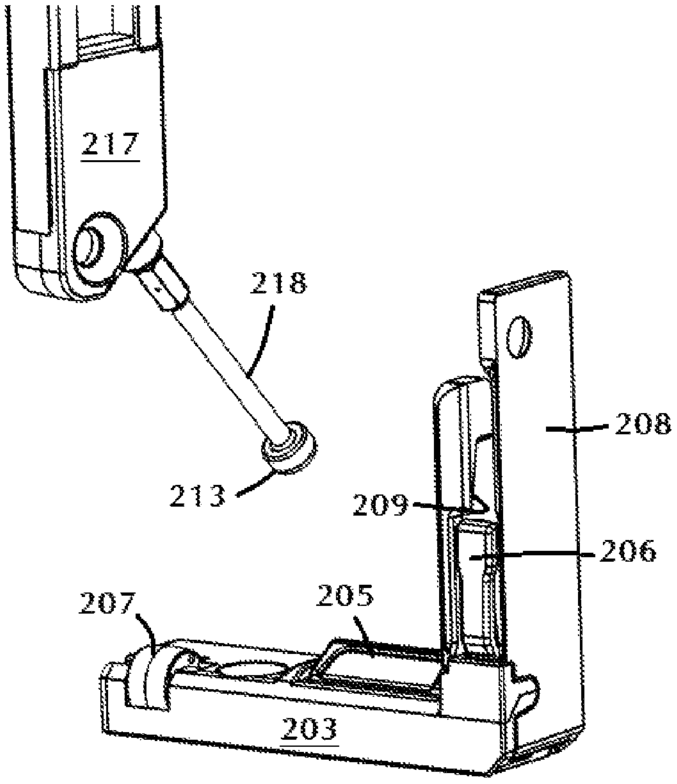
FIG. 7 is a perspective view of the WOCD of FIG. 6, with the components approaching each other prior to engagement.

To engage the WOCD assembly 200, cable or anchor end 213 is received in the retainer 208 of the second component 202 when the sash is moved to a closed position and the first and second components 210, 202 are moved into an adjacent position with respect to each other. With the window open, the cable end 213 is in a fully-retracted state within the first component 210 and held in position by socket 217 (FIGS. 3-4, 7). As the window closes, the "sash" side component approaches the "frame" side component, with the cable end 213 extending out of the socket 217. As best seen in FIG. 8, retainer opening 209 funnels the cable end 213 downward and into contact with the actuator gate portion 206, such that the gate portion is pivoted into the retainer opening, thereby permitting the cable end 213 to be received by the retainer. After the cable end 213 passes the vacated opening of the retainer 208 and loses contact with gate portion 206, spring 226 returns the actuator gate portion 206 to its default position, preventing the cable end from exiting the retainer 208. As best seen in FIG. 5, once the window is closed, the flexibility of cable end 213 allows for the cable end to rest within the retainer 208 and extend substantially coaxially with a vertical axis of the sash, such that the WOCD assembly 200 is not visible when the window assembly 100 is in the closed position because it is concealed by portions of frame 102.

To release the WOCD assembly 200, two distinct actions need to be taken. First, a user depresses the actuator button release portion 205, thereby pivoting actuator 204 about its longitudinal axis and in the direction of the opening 209 of retainer 208. While the button release portion 205 remains depressed, the user pushes the cable end 213 downward, such as via a touchpoint at terminal portion 218, translating the cable end past the segment of the retainer opening 209 which has been vacated by the pivoted actuator gate portion 206, and then exit the retainer 208, allowing for the cable 212 to be retracted into the first component 210 and the window sash 104 to be moved to a fully-open position or any other partially-open and unrestrained position. Once the actuator button portion 205 is released, the WOCD assembly 200 is reset and in position to automatically re-engage upon close of the window sash (FIGS. 3-4, 7, 9, and 13)

In at least one embodiment, as shown in FIG. 14, second component 202 may further include a lifter element 207, which may be positioned in a recessed portion of body 203 proximate actuator release button portion 205, such that a portion of lifter 207 extends above the top surface of the body 203. In the embodiment shown, lifter 107 is in the form of a roller, however it should be understood by those skilled in the art that other lifting means are not precluded, such as a wedge block which is angled upwardly to lift the incoming sash. As the sash 104 moves toward the closing position, lifter 207 contacts the bottom portion of the incoming sash 104 and raises the sash, helping to guide the cable end 213 into alignment to be received by the retainer opening 209, and thereby acting to offset any sash sag which may develop after numerous window/open close cycles. "Sash sag" refers to the downward movement of the lower corner of the sash at the lock side (as opposed to the hinge side) relative to the window frame, and is most common in casement style windows or those windows attached to the frame by hinges.

Thus, the present invention achieves one or more of the following advantages. The WOCD assembly of the present invention increases ease of use over other types of window fall prevention devices by including a flexible or partially flexible limiting element. The WOCD assembly of the present invention further does not interfere with proper closing of the window assembly and is concealed by the window frame when in a closed position so as to be aesthetically pleasing. A further advantage includes that the WOCD assembly cannot be easily overridden or bypassed by children, resulting in increased fall prevention and safety.

While the present invention has been particularly described, in conjunction with specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

The invention claimed is:

1. A window opening control assembly comprising:

a first component for attachment to one of a sash or a window frame, the first component comprising a latch assembly including an actuator and a retainer, a body, and a lifter element proximate the actuator and at least partially extending above a top surface of the body; and a second component for attachment to the other of the sash or the window frame, the second component comprising an at least partially flexible member that is extendable to the first component, wherein the at least partially flexible member is releasably secured by the latch assembly and fed from the second component as distance between the first and second components increases until an intermediate position is reached and the first and second components are restrained from further relative movement, and wherein the retainer releasably secures the at least partially flexible member within the latch assembly and the latch assembly is selectively unlatched to permit removal of the at least partially flexible member from the latch assembly to permit free movement between the first and second components.

2. The window opening control assembly of claim 1 wherein the actuator includes a button release portion and a gate portion, the actuator normally biased in a first direction to prevent removal of the at least partially flexible member from the retainer.

3. The window opening control assembly of claim 2 wherein the actuator button release portion and gate portion do not move independently of one another.

4. The window opening control assembly of claim 2 wherein the actuator is movable in a second direction opposite the first direction to cause the gate portion to cease blocking the retainer and permit removal of the at least partially flexible member from the retainer.

5. The window opening control assembly of claim 1 wherein the actuator is a rotary actuator.

6. The window opening control assembly of claim 1 wherein the retainer aligns and secures the at least partially flexible member at the latch assembly when the first component and second component are moved adjacent to one another.

7. The window opening control assembly of claim 6 wherein the at least partially flexible member includes a terminal end comprising an anchor, and the retainer aligns the at least partially flexible member at the latch assembly as the retainer receives the anchor.

8. The window opening control assembly of claim 1 wherein the at least partially flexible member comprises a cable, rope, line, tape, wire, ribbon, or cord.

9. The window opening control assembly of claim 1 wherein the at least partially flexible member includes an end comprising an anchor that is adapted to be captured by the retainer to prevent removal until the latch assembly is selectively unlatched.

10. The window opening control assembly of claim 1 wherein the second component includes a retraction mechanism for automatically retracting the at least partially flexible member into the second component when the latch assembly is selectively unlatched.

11. The window opening control assembly of claim 10 wherein the retraction mechanism is a constant force spring.

12. The window opening control assembly of claim 1 wherein the second component includes a stop for setting an effective length of the at least partially flexible member as it extends to the first component.

13. The window opening control assembly of claim 12 wherein the second component comprises an elongated body having a channel extending along a longitudinal axis thereof and wherein the longitudinal position of the stop is adjustable within the channel.

14. The window opening control assembly of claim 1 wherein the second component comprises an elongated body having a channel extending along a length thereof and a socket at one end of the channel, the at least partially flexible member extending within the channel along the length of the body and terminating outwardly from an opening of the socket for being received by the retainer.

15. The window opening control assembly of claim 1, wherein the lifter element comprises a roller or an upwardly-angled wedge block.

16. A window opening control assembly comprising:

a first component for attachment to one of a sash or a window frame, the first component comprising a latch assembly including an actuator and a retainer; and a second component for attachment to the other of the sash or the window frame, the second component comprising an elongated body having a channel extending along a longitudinal axis thereof and an opening at a distal end of the channel, an at least partially flexible member extending within the channel along the length of the body and terminating outwardly from the channel opening for being received by the retainer, the at least partially flexible member being extendable to the first component, and a stop for setting an effective length of the at least partially flexible member as it extends to the first component, wherein the longitudinal position of the stop is adjustable within the channel, wherein the at least partially flexible member is releasably secured by the latch assembly and fed from the second component as distance between the first and second components increases until an intermediate position is reached and the first and second components are restrained from further relative movement, and wherein the retainer releasably secures the at least partially flexible member within the latch assembly and the latch assembly is selectively unlatched to permit removal of the at least partially flexible member from the latch assembly to permit free movement between the first and second components.

17. The window opening control assembly of claim 16 wherein the first component further comprises a body and a lifter element proximate the actuator and at least partially extending above a top surface of the body.

18. A method of operating a window assembly, comprising:

moving a first component attached to one of a sash or a frame of the window assembly to a position adjacent a second component attached to the other of the sash or the frame, the first component comprising a latch assembly including a single actuator and a retainer, the first component further comprising a body and a lifter element proximate the actuator and at least partially extending above a top surface of the body, the actuator including a button release portion and an integral gate portion and being normally biased in a first direction to block an opening of the retainer, the actuator pivotable between a first position blocking the retainer opening and a second position permitting access to the retainer opening, and the second component comprising an at least partially flexible member that is extendable to the first component;

raising a lower portion of the sash via the lifter element to align the at least partially flexible member with the retainer as the sash moves toward a closed position with respect to the frame;

securing a portion of the at least partially flexible member within the retainer as the first component approaches the second component by causing the actuator to pivot from the first position to the second position; and feeding the at least partially flexible member from the second component as the sash is moved away from the frame until the sash reaches an intermediate position and the sash is restrained from further movement away from the frame.

19. The method of claim 18 further comprising:

causing the actuator to move in a second direction opposite the first direction to cause the gate portion to cease blocking the retainer and permit removal of the at least partially flexible member;

selectively translating the at least partially flexible member past the actuator gate portion to exit the retainer; and continuing to move the sash away from the frame.

20. The method of claim 19 wherein the second component includes a retraction mechanism for automatically retracting the at least partially flexible member into the second component when the latch assembly is selectively unlatched and wherein the second component further comprises an elongated body having a channel extending along a length thereof and a socket at one end of the channel, the at least partially flexible member extending within the channel along the length of the body, and further including the step of:

retracting the at least partially flexible member into the second component body until a terminal portion of the at least partially flexible member extends outwardly from an opening of the socket.

* * * * *